United States Patent [19]

Tisdale, III et al.

[11] 3,855,835

[45] Dec. 24, 1974

[54] APPARATUS FOR LAYING PIPELINES

[76] Inventors: Benjamin Cornwall Tisdale, III, 10144 Idlewood Pl., New Orleans, La. 70123; William Buford Nicholson, 4409 Cleveland Pl., Metairie, La. 70003

[22] Filed: Dec. 10, 1973

[21] Appl. No.: 423,206

[52] U.S. Cl................... 72/183, 72/164, 61/72.3
[51] Int. Cl............................................. B21d 3/02
[58] Field of Search....................... 72/183, 160, 164

[56]  References Cited
UNITED STATES PATENTS

| | | | |
|---|---|---|---|
| 2,720,242 | 10/1955 | Siegerist | 72/164 |
| 3,237,438 | 3/1966 | Tesson | 72/161 |
| 3,422,652 | 1/1969 | Lorenz | 72/164 |

Primary Examiner—Milton S. Mehr
Attorney, Agent, or Firm—James B. Lake, Jr.

[57] ABSTRACT

This invention embodies an apparatus for laying subsea pipeline from a reel or drum mounted on a movable floating vessel such as a barge or a workboat and straightening the pipeline in a manner that does not damage the coating of the pipeline. The reel is skid mounted and tied down to the vessel so that the pipeline can be unwound from the reel toward the stern of the vessel and into the water as the vessel is moved forwardly. Two sets of straightening rollers are positioned to reverse bend the pipe as it is unspooled from the reel to remove substantially all of the permanent curvature in the pipeline caused by winding on the reel in both the horizontal and vertical directions. These rollers are so constructed to straighten the pipe without damaging the protective coating that is put on the pipe to eliminate corrosion.

1 Claim, 4 Drawing Figures

3,855,835

APPARATUS FOR LAYING PIPELINES

BACKGROUND OF THE INVENTION

This invention relates, in general, to an apparatus for laying pipelines, and more particularly, to an apparatus for laying subsea pipeline wound on a reel rotatably mounted on a movable floating vessel.

U.S. Pat. Nos. 3,237,438 and 3,372,461 disclose apparatus for laying pipeline which are representative of the apparatus heretofore used for laying subsea pipeline wound on a reel mounted on a movable floating vessel. In such apparatus, a pipeline comprising a plurality of joined pipe sections is wound on a rotatable reel which is permanently mounted on a floating vessel such as a barge. The vessel is then moved in the desired direction of the pipeline while the pipeline is unwound from the reel and lowered to the bottom. As the pipeline leaves the reel, and before it enters the water, it is bent in a direction which is the reverse of that in which it was bent on the reel, in order to straighten the pipe before it is lowered into the water.

In most cases, the reel upon which the pipeline is wound is supported for rotation about a vertical axis on the vessel. Accordingly, the pipe is then straightened by reverse bending the pipe in a horizontal plane as it leaves the reel. Since the reel has several layers of pipe wound thereon, the amount of reverse bend required to straighten the pipe will vary from layer to layer. If the pipe is not reverse bent enough or is reverse bent too much, the pipe will again assume the curvature that will relieve it of stress when it reaches the bottom. In such cases, the pipe will tend to curve away from the desired direction of the pipeline, which is highly undesirable.

When pipe is wound upon a reel, it assumes the curvature of the reel and is also bent in a helical fashion. It can be readily seen that the existing apparatus provides for straightening in one direction only and does not remove the helical bend which is highly undesirable.

Also, when pipe is wound and removed from the extreme edges of the reel, excessive loads are applied to the protective coating by the straightening device which damages the coating and is also undesirable.

SUMMARY OF THE INVENTION

In the apparatus of the present invention, the pipeline is unwound from a reel rotatably mounted on a movable floating vessel. The pipeline is advanced toward the stern of the vessel and into the water as the vessel is moved forward.

A Two-Straightening roller assembly is positioned on the deck of the vessel to reverse bend the pipeline as it is unwound from the reel to remove the permanent curvature and helical bend in the pipeline caused by winding on the reel. Preferably, the reel is mounted on the deck of the vessel for rotation about a substantially horizontal axis.

By mounting the reel on the vessel for rotation about a substantially horizontal axis, and reverse bending the pipeline as it leaves the reel in a substantially vertical plane to remove any permanent curvature placed in the pipe when it was wound on the reel, any residual curvature left in the pipeline as a result of under or over reverse bending thereof, will tend to cause the pipe to bow in a vertical position which will be resisted by the weight of the pipe and is not objectionable.

As another feature of the present invention, the two-straightening rollers are movable horizontally relative to each other and substantially parallel to the axis of rotation of the reel for the purpose of removing the residual helical bend in the pipeline and are movable horizontally together for the purpose of level winding the pipe as it is wound and unwound from the reel to prevent damage to the coating or yielding the pipe.

DESCRIPTION OF THE DRAWINGS

Figure 1:
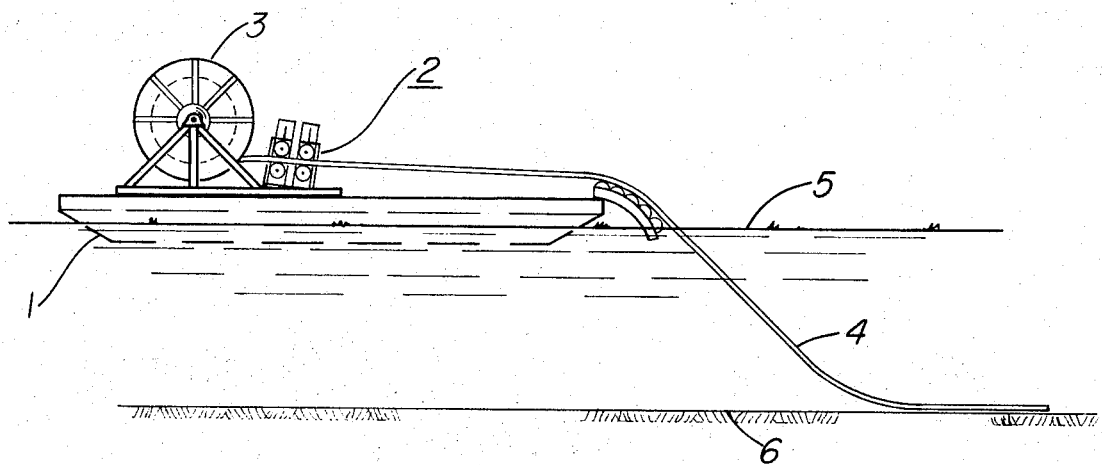
FIG. 1 is a side elevational view of the apparatus of the present invention supported on a floating vessel for laying pipeline in the water.

In FIG. 1, the apparatus of this invention is shown supported on vessel (1), that is floating in a body of water (5). The apparatus is shown laying a continuous pipeline (4) along the floor (6) of the body of water as the vessel (1) moves in the desired direction of the pipeline.

Before the laying operation begins, the pipeline (4) is wound on the reel (3). Usually, the connecting of the pipe sections and the winding of the pipe on the reel is done at a dock.

Figure 2:
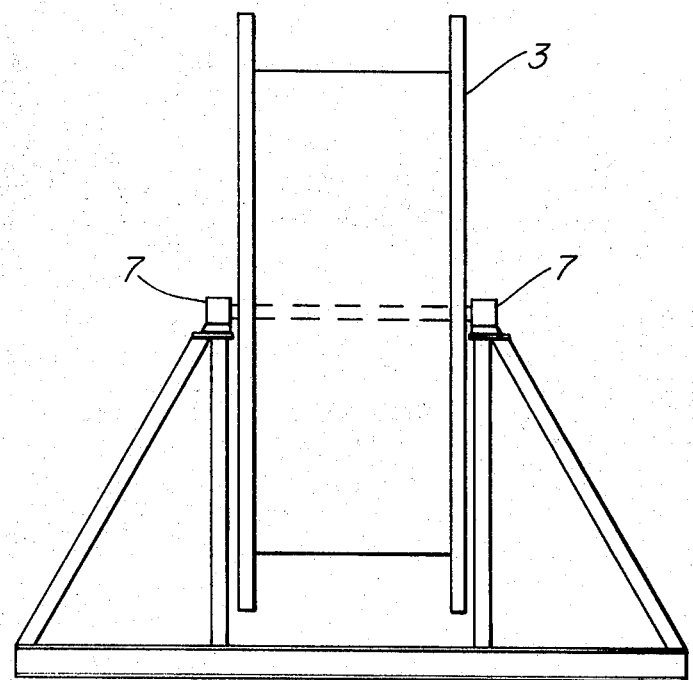
FIG. 2 is an enlarged sectional view of the reel.

As best seen in FIG. 2, reel (3) icludes a cylindrical drum with end flanges and is supported by an axle on which two bearings (7) are mounted and which are supported by a reel frame (8).

It will be readily seen, therefore, that reel (3) is mounted on frame or base (8) and vessel (1) for rotation about a substantially horizontal axis. Power means (not shown) of any suitable type are provided to rotate the reel at any desired speed to effect unwinding of the pipeline from the reel or winding of the pipeline onto the reel, and to maintain the desired tension in the pipe in conjunction with the speed of forward movement of the barge.

Figure 4:
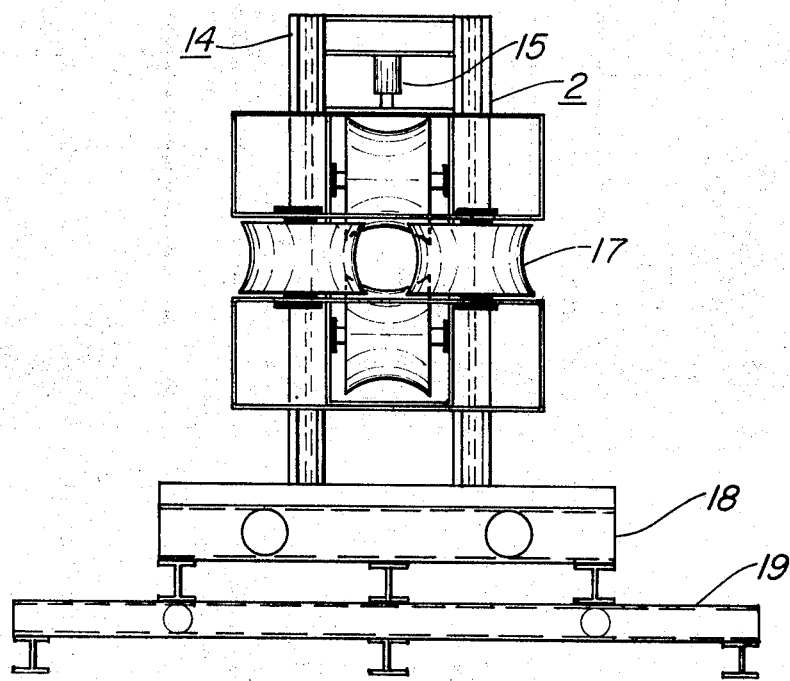
FIG. 4 is an end view of the straightening assembly in FIG. 3.

Referring to FIGS. 1 and 4, means are provided to reverse bond the pipeline (4) as it is unwound from the reel (3) to straighten the pipeline before it leaves the vessel (1) and enters the water (5). With the reel (3) as described above, the pipeline is bent substantially in a vertical plane as it is wound onto the drum section (3). Therefore, a straightening assembly (2) is provided on the deck of the vessel (1) between the reel (3) and the stern of the vessel for reverse bending the pipeline in a substantially vertical plane in order to remove any permanent curvature or deformation therein caused by winding onto reel (3) and also in the horizontal plane to remove any permanent deformation caused by helically coiling the pipe on the reel.

The straightening assembly (2) includes means to vary the radius of curvature to which the pipeline (4) is bent in both the vertical and horizontal planes as it travels therethrough. In the embodiment shown, rollers (9) are supported by shafts (10) the opposite ends of which are supported by bearings (11) of any suitable type. These bearings are attached to U-shaped plates (12), that are movable vertically between the flanges of vertical beams (13) to support hydraulic cylinders (15), the rod ends of which are connected to the U- shaped plates (12) for moving the plates and roller (9) along the longitudinal axis of beam (13).

Figure 3:
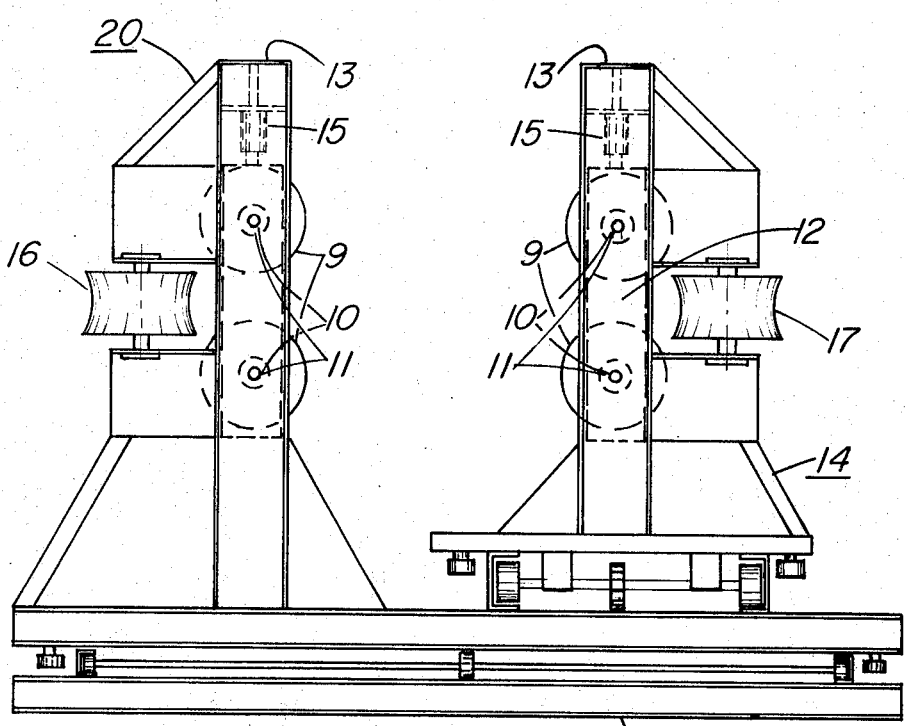
FIG. 3 is an enlarged side view of the Two-Straightening assemblies.

As shown in FIGS. 3 and 4, pipeline (4), as it is unwound from reel (3) passes between stationary rollers (16), and then it is engaged by movable roller (9) that causes it to be bent upwardly between rollers (9). The pipeline leaves the straightening assembly between stationary rollers (17). The amount of reverse bend is determined by the position of movable rollers (9) which can be adjusted, as required, by power cylinders (15) or by any other suitable power means.

The straightening frame (14) is movable horizontally on frame (18) which is also movable horizontally on frame (19). The horizontal movement of frame (14) in relation to frame (20) while frame (18) is moved horizontally on frame (19) causes the pipe to be bent in a direction opposite that of the residual helical bend caused by coiling, thus straightening the pipe in the horizontal plane.

We claim:

1. In an apparatus supported on a floating vessel for laying pipeline on a water bottom, pipeline straightening means comprising in combination:
   a. reel means mounted for rotation around a horizontal axis on said vessel for the dual function of reeling a pipeline on for storage and off for laying, and for defining a first rigid point of three sequential points between which a pipeline must be led to remove a curvature therein and place one thereon;
   b. a first set of rollers, adapted to vertical adjustment, and defining the second point of said three sequential points, said first set comprising a pair of peripherally opposed rollers mounted for rotation around parallel vertical axes, and a second pair similarly opposed and mounted for rotation around parallel horizontal axes, said pairs of rollers defining a pipeline passageway;
   c. a second set of rollers similar to the first set and spaced therefrom with its pairs of rollers reversed to define the third point of said three sequential points and a continuation of said pipeline passageway;
   d. a first platform mounted on said floating vessel adjacent said reel, the first set of rollers being fixed thereon and said platform being adjustably movable parallel to the horizontal axis of said reel for the horizontal adjustment of said first set relative to said reel;
   e. a second platform mounted for horizontal movement on said first platform, the second set of rollers being fixed on said second platform and spaced from said first set of rollers, the second platform being adjustably movable parallel to the horizontal movement of said first platform for the horizontal adjustment of said second set of rollers relative to said first set, whereby said first and second set of rollers are precisely alignable to direct a pipeline onto the reel to prevent excessive bending and coating damage, and off the reel straightened for laying.

* * * * *